US012697832B2

(12) United States Patent
Skeren et al.

(10) Patent No.: US 12,697,832 B2
(45) Date of Patent: Aug. 4, 2026

(54) OPTICAL SECURITY DEVICE

(71) Applicant: IQ STRUCTURES S.R.O.,
Husinec-Rez (CZ)

(72) Inventors: Marek Skeren, Nova Ves I (CZ);
Zbynek Ryzi, Littleton, MA (US);
Roman Nahalka, Beroun (CZ)

( * ) Notice: Subject to any disclaimer, the term of this
patent is extended or adjusted under 35
U.S.C. 154(b) by 978 days.

(21) Appl. No.: 17/284,014

(22) PCT Filed: Oct. 11, 2019

(86) PCT No.: PCT/EP2019/077602
§ 371 (c)(1),
(2) Date: Apr. 9, 2021

(87) PCT Pub. No.: WO2020/074706
PCT Pub. Date: Apr. 16, 2020

(65) Prior Publication Data
US 2021/0379921 A1 Dec. 9, 2021

(30) Foreign Application Priority Data

Oct. 12, 2018 (GB) ..................................... 1816641

(51) Int. Cl.
B42D 25/328 (2014.01)
B42D 25/351 (2014.01)
(Continued)

(52) U.S. Cl.
CPC ......... B42D 25/328 (2014.10); G03H 1/0011
(2013.01); G03H 1/2249 (2013.01);
(Continued)

(58) Field of Classification Search
CPC .... G03H 1/0011; G03H 1/2249; G03H 1/265;
G03H 1/0005; G03H 1/0244;
(Continued)

(56) References Cited

U.S. PATENT DOCUMENTS

| | | | |
|---|---|---|---|
| 6,097,514 | A | 8/2000 | Nishikawa |
| 2002/0044313 | A1 | 4/2002 | Menz et al. |

(Continued)

FOREIGN PATENT DOCUMENTS

| | | |
|---|---|---|
| DE | 19926733 | 12/2000 |
| EP | 1 564 605 | 8/2005 |

(Continued)

OTHER PUBLICATIONS

Intellectual Property Office, Search Report, App. No. GB1816641.3
(Apr. 11, 2019).

(Continued)

*Primary Examiner* — Jyotsna V Dabbi
(74) *Attorney, Agent, or Firm* — Walters & Wasylyna
LLC

(57) ABSTRACT

An security device comprises a recorded representation of
an optically variable image which is reconstructable and
viewable for a security purpose, and comprises: an optical
structure having recorded therein a representation of the
optically variable image in the form of a plurality of discrete
portions of the complete image to be reconstructed, wherein
the plurality of image portions can, when reconstructed, only
be viewed in their totality by viewing the image at or over
a plurality of different viewing angles or angle ranges
relative to the optical structure and/or at or over a plurality
of different angles or range of angles of illumination of the
optical structure, and wherein the size, in at least one
dimension, of the complete image, when reconstructed, is
greater than the corresponding size, in the same dimension,
of a part of the optical structure having the plurality of image
portions are collectively recorded therein.

21 Claims, 4 Drawing Sheets

(51) Int. Cl.
　　*B42D 25/355*　　(2014.01)
　　*G03H 1/00*　　(2006.01)
　　*G03H 1/22*　　(2006.01)

(52) U.S. Cl.
　　CPC .......... *B42D 25/351* (2014.10); *B42D 25/355* (2014.10); *G03H 2001/0016* (2013.01)

(58) Field of Classification Search
　　CPC .......... G03H 1/0248; G03H 1/26; G03H 1/22; G03H 1/2223; G03H 2001/0016; G03H 2001/2236; G03H 2001/0022; G03H 2001/226; G03H 2001/2263; G03H 2001/2271; G03H 2210/55; G02B 5/18; B42D 25/328; B42D 25/351; B42D 25/355
　　USPC .......................................................... 359/2
　　See application file for complete search history.

(56)　　　　　　References Cited

U.S. PATENT DOCUMENTS

2003/0174373　A1*　9/2003　Drinkwater .......... G03H 1/0011
　　　　　　　　　　　　　　　　　　　　　359/15

2007/0076279　A1*　4/2007　Holmes ................ B42D 25/328
　　　　　　　　　　　　　　　　　　　　　359/2
2007/0223074　A1　9/2007　Harris
2008/0239423　A1　10/2008　Kitamura et al.
2009/0091834　A1*　4/2009　Ryzi .................... G03H 1/0011
　　　　　　　　　　　　　　　　　　　　　359/569
2009/0316238　A1　12/2009　Drinkwater
2015/0070350　A1　3/2015　Cape
2016/0333526　A1*　11/2016　Macpherson ........ B42D 25/324
2018/0215188　A1　8/2018　Wang et al.

FOREIGN PATENT DOCUMENTS

| EP | 2038692 | 3/2009 | |
| JP | 2017129802 | 7/2017 | |
| WO | WO0073991 | 12/2000 | |
| WO | WO-2005010684 A2 * | 2/2005 | ....... G06K 19/06046 |
| WO | WO2005038499 | 4/2005 | |

OTHER PUBLICATIONS

International Searching Authority: International Search Report and Written Opinion, Intl. App. No. PCT/EP2019/077602 (Jan. 20, 2020).

* cited by examiner

OPTICAL SECURITY DEVICE

This application is the U.S. national phase entry of Intl. App. No. PCT/EP2019/077602 filed on Oct. 11, 2019, which claims priority from GB1816641.3 filed on Oct. 12, 2018. The entire contents of PCT/EP2019/077602 and GB1816641.3 are incorporated herein by reference.

TECHNICAL FIELD

This invention relates to an optical security device, more particularly (though not exclusively) to an optical security device incorporating a recorded or encoded optically variable image, especially (though not exclusively) a holographic image, which is able to be reconstructed and viewed for security, authentication or identification purposes. Such a security device is usable for example for protection, authentication or identification of various items or objects including securities, credit and debit cards, banknotes, tickets, passports, visas, ID cards, branded goods, and various other items whose value or nature benefits from an added security feature. More particularly, though not exclusively, the invention relates in its various aspects to an optical security device, or an optical security feature of or included in such a device, to a method of production of such an optical security device, and to a method of reconstruction of an image recorded or encoded in such an optical security device, which reconstruction is for security, authentication or identification purposes.

BACKGROUND AND PRIOR ART

As used herein, the term "optical security device" is to be construed broadly and means any physical or functional device, apparatus, object, item or thing that relies on optics or the manipulation or effects of electromagnetic radiation for, and is designed and intended for use in connection with, one or more security purposes, e.g. for protection, authentication or identification purposes of an item of property or some other object, item or thing. Such a "device" may be a physical thing per se which may be incorporated into or included in or on the structure of the item, object or thing whose security is to be so effected, or it may be an inherent part, portion or feature of the item, object or thing itself whose security is to be so effected.

As used herein, the term "optically variable image" means an image whose visual appearance to a viewer changes with an angle at which the viewer observes the image and/or with an angle at which the image is illuminated by light for the purpose of its reconstruction. For example, the change in the image's appearance may be perceived by the viewer as a change in one or more parameters of the image reconstructed, such as its shape, configuration, colour, brightness or angle of view (in the case of a 3D image), and/or even as a change in the identity of the image itself, or one or more portions of the image itself, that is reconstructed. Certain types of hologram often record or encode optically variable images.

As used herein, the terms "recorded" and "encoded", as applied to the form in which the optically variable image or portion thereof is incorporated or represented within the optical structure of the device, encompasses the provision of any form of record of the said image or portion thereof, whether it be an original or "master" recorded or encoded representation of the said image or portion thereof in the optical structure of the device, or a derivative or replicated representation of the said image or portion thereof in the optical structure of the device. Such "recording" and "encoding" may also encompass "embossing" or other physical application or provision of the representation of the image or portion thereof in the material of the optical structure, e.g. in the form of optical relief thereon or therein, as well as encompassing any other optically functional manner of provision of the representation of the image or portion thereof in the material of the optical structure.

Security features of the nature of holograms are frequently incorporated as, or so as to form, security devices in the structures of items or objects, especially printed items, such as securities, credit and debit cards, banknotes, tickets, passports, visas, ID cards and other valuable items, for the purpose of identifying them or authenticating them as genuine, or other security-related purpose. Typically the hologram is a record or encoded representation of a predefined optically variable security image, e.g. of a unique object, picture, pattern, arrangement of alphanumeric or other characters, or any combination thereof, often a three dimensional image or an image placed in three dimensional space in front of and/or beyond the device itself, and the recreation of the image under appropriate viewing conditions, e.g. white light, enables the authenticity of the item to be confirmed.

Such a holographic security feature or device can be incorporated for example within a strip or stripe that is integrated into the structure of the item or object in question, so as to be visible when a face of the item or object is viewed. The strip or stripe may contain any number, type or combination of various security features or devices, including security holograms. Such a strip or stripe may for example be generally straight or curved in configuration, and/or it may be formed by a combination of a plurality of variously shaped graphical regions or shapes, and/or it may be patterned. Generally however the width of the strip or stripe is characteristically smaller than its length, and its width may be either generally substantially constant, or alternatively variable, along the length of the strip or stripe.

Often the optically variable image record-containing strip or stripe may even contain a plurality of various forms of security features, including any number of overt or covert features, e.g. graphics, holograms, micro- or nano-graphics, diffractive or non-diffractive images and structures, hidden images, and suchlike. These features are generally incorporated into the strip or stripe material typically in the form of appropriate optical structures comprising modulations of the strip/stripe's surface, volume or internal optical properties of its material.

In many cases the physical width of the strip/stripe is actually quite narrow, yet it desirably needs to include one or more recognizable graphic or holographic images viewable by the naked eye or by use of a simple or readily available reading device. This certainly poses a challenge to a designer who needs to satisfy what are often conflicting requirements for a high level of complexity and thus security of the security feature(s) contained in a very small area of the device, yet at the same time making it/them conveniently recognizable.

However, with ever increasing needs for ever more advanced and/or new types of security features that are less prone to counterfeiting and permit higher degrees of security identification, authentication or verification, known hologram-based security features only go so far, and many fail to meet the high or new demands of such security features that are increasingly being required in the industry. Furthermore, although in certain known security feature-based applications this issue can to some extent be addressed by the use of additional encrypted features or special unnatural visual effects or their combinations, such alternative security elements are at best only a partial solution to the problem and often lead to unnecessarily complex security structures that are expensive to produce and apply and are overly difficult or complicated to read or view.

Thus, it is a primary object of the present invention to address this shortcoming in the art and to provide a new and improved, yet relatively cheap and easy to apply, form of security feature or device usable in a variety of security, authentication or identification scenarios, e.g. in securities, credit and debit cards, banknotes, tickets, passports, visas, ID cards, branded goods, and other valuable items, and which is capable of providing enhanced levels of optical security/authentication/identification capability.

SUMMARY OF THE INVENTION

Accordingly, in a first aspect of the present invention there is provided an optical security device comprising a recorded or encoded representation of an optically variable image, the image being reconstructable and viewable for security, authentication or identification purposes, the device comprising:

an optical structure in which there is recorded or encoded a representation of the optically variable image in the form of a plurality of portions of the complete image to be reconstructed, wherein the respective said plurality of portions of the optically variable image can, when reconstructed, only be viewed in their totality by viewing the said image at or over a plurality of different viewing angles or angle ranges relative to the optical structure and/or at or over a plurality of different angles or ranges of angles of illumination of the optical structure, and wherein the size, in at least one dimension, direction, axis or plane, of the complete image, when reconstructed, is greater than the corresponding size, in the same, or the respective same, dimension, direction, axis or plane, of a part of the optical structure having the said plurality of portions of the image collectively recorded or encoded therein.

In the preceding definition, the reference to the respective said plurality of portions of the optically variable image, when reconstructed, only being viewable "in their totality", means that the complete image is only viewable by virtue of all the portions thereof each being respectively reconstructed and viewed (e.g. in a sequential manner).

The optical variable image itself represents information for authentication or identification purposes in what may be a graphical or holographical form. Such information, i.e. the image, to be identified and/or used for authentication cannot be viewed in just one viewing step or viewing configuration (i.e. at a single combination of viewing angle/range of viewing angles and angle of illumination/range of angles of illumination), since the optical structure in which the image is recorded or encoded is purposely substantially smaller than the image itself (at least in one respective dimension), and as such provides only a small or narrow viewing window or aperture through which the image can be viewed, which forces the use of plural combinations of viewing angles and/or angles of illumination in order to view and fully identify all information represented by the image. All such information is distributed across a plurality of the image portions, and therefore also each portion of the image needs to be viewed in full in order to authenticate or identify all the information contained in the image.

In some embodiments of the invention in its various aspects, the fully viewed image may furthermore need to be decoded by a separate key provided by the designer of the image and the optical structure in which the image is recorded or encoded. Examples of such embodiments are described in detail further below.

As used herein, the term "portion", as referring to a part of the optically variable image either when it has been reconstructed or in its recorded or encoded form, means any part of the image in either form which is less than the whole thereof in either two dimensions or three dimensions or a combination of two and three dimensions. Such a part representing a "portion" may be any definable part of the image (in either form), and does not need to be separately or discretely viewable from any other part of the image, although it may indeed be separately or discretely viewable from one or more other parts of the image. Thus, such a part representing a "portion" of the image (in either form) may possibly overlap with or be definable so as to be at least partially in common with one or more other parts of the image. Furthermore, in the case of such a "portion" which is defined as a part of the image (in either form) which is less than the whole thereof in three dimensions, the meaning of "portion" may include a part of the image (in either form) which is different in appearance from the first-mentioned part or another part, even though those parts may not, when viewed, be physically distinct parts or regions or components of the complete image.

In the context of this invention, the references to "ranges of viewing angles" or "viewing angle ranges" relative to the optical structure and "ranges of angles of illumination" or "illumination angle ranges", in addition to specifically single or unique such "viewing angles" or "illumination angles", are included in order to take account of the fact that from a physics point of view, for any given optical structure of the kind that embodiments of the invention are concerned with, there may well be a range of viewing or illumination angles—not just one single or unique such angle—at which any given portion may be viewable. In many embodiments this feature of the viewing or illumination angle being more appropriately or correctly defined as an angular range may therefore be an inherent property of the physics of the reconstructable recorded/encoded image. Accordingly, as used throughout this specification, references to "a [or a given or respective] viewing angle" and "an [or a given or respective] angle of illumination" should, unless stated or the context dictates otherwise, be construed as encompassing also "a [or a given or respective] range of viewing angles" and "a [or a given or respective] range of angles of illumination", respectively.

In some embodiments of the optical security device of the invention the optical structure may have recorded or encoded therein a representation of the optically variable image in the form of a plurality of portions of the complete image to be reconstructed, wherein each respective one of some or all of the said plurality of portions of the optically variable image can, when reconstructed, only be viewed in full by viewing the said respective image portion at or over a respective range of viewing angles (i.e. at or over more than one specific viewing angle) relative to the optical structure and/or at or over a range of angles of illumination (i.e. at or over more than one specific illumination angle) of the optical structure.

In some of the embodiments of the preceding paragraph, each respective one of some or all of the said plurality of portions of the optically variable image may, when reconstructed, only be viewed in full by viewing the said respective image portion at or over a respective range of viewing angles (i.e. at or over more than one specific viewing angle) relative to the optical structure and at a respective given angle of illumination (i.e. at a substantially single or unique angle of illumination) of the optical structure.

Alternatively to the preceding paragraph, in other embodiments of the preceding-but-one paragraph, each respective one of some or all of the said plurality of portions of the optically variable image may, when reconstructed, only be viewed in full by viewing the said respective image portion at a respective given viewing angle (i.e. at a substantially single or unique viewing angle) and at or over a respective range of angles of illumination (i.e. at or over more than one specific illumination angle) of the optical structure.

In some embodiments of the optical security device of the invention the optical structure may have recorded or encoded therein a representation of the optically variable image in the form of a plurality of discrete portions of the complete image to be reconstructed, wherein each respective one of the said plurality of portions of the optically variable image can, when reconstructed, only be viewed by viewing the respective said image portion at or over a respective viewing angle or angle range relative to the optical structure and/or angle or angle range of illumination of the optical structure which is different from the viewing angle/angle range and/or angle/angle range of illumination at or over which at least one other of the said image portions is viewable when reconstructed.

In some embodiments, the respective viewing angle/angle range and/or angle/angle range of illumination at or over which a, or any, given one of the image portions can be viewed, when reconstructed, may be substantially the same viewing angle/angle range and/or angle/angle range of illumination at or over which at least one other of the said image portions, but not all of those other said image portions, (optionally or at least some of, but not all of, the remaining reconstructed image portions) is/are viewable when reconstructed.

Put another way, in some embodiments, the respective viewing angle/angle range and/or angle/angle range of illumination at or over which a, or any, given one of the image portions can be viewed, when reconstructed, may be substantially different from the respective viewing angle(s)/angle range(s) and/or angle(s)/angle range(s) of illumination at or over which at least one other of the of the reconstructed image portions (optionally or at least some of the remaining reconstructed image portions) is/are viewable.

Thus, in such embodiments of the preceding two paragraphs, in order for the complete reconstructed image to be viewable in its totality—which is to say, in order for all the portions of the complete reconstructed image to each be respectively reconstructable and viewable (e.g. in a sequentially manner)—it may be necessary for at least two different viewing angles/angle ranges and/or angles/angle ranges of illumination to be employed to view all the reconstructed image portions.

However, in other such embodiments, the respective viewing angle/angle range and/or angle/angle range of illumination at or over which a, or any, given one of the image portions can be viewed, when reconstructed, may be substantially different from the respective viewing angles/angle ranges and/or angles/angle ranges of illumination at or over which substantially all the other reconstructed image portions are viewable.

Thus, in such other embodiments of the preceding paragraph, in order for the complete reconstructed image to be viewable in its totality—which is to say, in order for all the portions of the complete reconstructed image to each be respectively reconstructable and viewable (e.g. in a sequential manner)—it may be necessary for a plurality of different viewing angles/angle ranges and/or angles/angle ranges of illumination to be employed to view respective ones of the plurality of reconstructed image portions. In some such embodiments, each respective viewing angle/angle range and/or angle/angle range of illumination at or over which a respective reconstructed image portion is viewable may be unique to that respective reconstructed image portion.

In some embodiments of the optical security device of the first aspect of the invention, the size, in at least one dimension, direction, axis or plane, of one or more given ones of the viewable portions of the reconstructed image may be greater than the corresponding size, in the same, or the respective same, dimension, direction, axis or plane, of a part of the optical structure having the said one or more given optically variable image portion(s) recorded or encoded therein.

Alternatively, in some other embodiments of the optical security device of the first aspect of the invention, the size, in at least one dimension, direction, axis or plane, of a given part of the optical structure having one or more given ones of the optically variable image portion(s) recorded or encoded therein may be smaller than the corresponding size, in the same, or the respective same, dimension, direction, axis or plane, of the said one or more respective viewable portion(s) of the reconstructed image.

In many embodiments of the invention in its various aspects the recorded or encoded representation of the optically variable image may be a hologram. In other words, in such embodiments the recorded or encoded representation of the optically variable image may be a holographic recorded or encoded image.

In various embodiments of the invention in its various aspects, the recorded or encoded representation of the optically variable image may be a two-dimensional (2-D) or a three-dimensional (3-D) hologram, especially an encoded 2-D or 3-D image or an image of any suitable 2-D or 3-D object, picture, pattern, one or more (e.g. a series of) alphanumeric or other (e.g. typographical) characters, or other arrangement of one more visual components or elements. The encoded image may even, in some embodiment forms, be a combination of one or more 2-D objects and one or more 3-D objects. Such an image or object, picture, pattern, one or more (e.g. a series of) alphanumeric or other (e.g. typographical) characters, or other arrangement may have or comprise any one or more colour(s) or may be composed of any combination of any of a plurality of colours, optionally including any desired auxiliary visual optical properties or features.

In some embodiments of the invention the optical structure having the portion(s) of the optically variable image recorded or encoded therein may be or comprise a DOVID (diffractive optically variable image device).

In some embodiments of the invention in its various aspects the optical structure may define a structure plane, especially a plane which is contained within the thickness of the optical structure and/or which is non-parallel to light incident on the optical structure during the reconstruction of the recorded or encoded image, and the reconstructed image may lie out of—i.e. it may lie wholly or at least partially to one side of, or possibly to each of both sides of—the said structure plane. In some such embodiments the reconstructed image may lie out of the structure plane on the side thereof opposite to that from which the illuminating light is incident thereon.

In some embodiment forms of the above-defined security device, the device may take the form of a security feature which has already been applied to or incorporated into the structure of an item or object whose security, authentication or identification is required. However, in other embodiment forms, the above-defined security device may be provided in the form of a discrete security device or security element for application, affixation or incorporation into the structure of an item or object whose security, authentication or identification is required.

In a second aspect of the present invention there is provided a method for the production of an optical security device comprising a recorded or encoded representation of an optically variable image, the image being reconstructable and viewable for security, authentication or identification purposes, the method comprising:

recording or encoding in an optical structure a recorded or encoded representation of the optically variable image in the form of a plurality of portions of the complete image to be reconstructed, wherein the respective said plurality of portions of the optically variable image can, when reconstructed, only be viewed in their totality by viewing the said image at or over a plurality of different viewing angles or angle ranges relative to the optical structure and/or at or over a plurality of different angles or ranges of angles of illumination of the optical structure, and wherein the size, in at least one dimension, direction, axis or plane, of the complete image, when reconstructed, is greater than the corresponding size, in the same, or the respective same, dimension, direction, axis or plane, of a part of the optical structure having the said plurality of portions of the image collectively recorded or encoded therein.

Various specific features of embodiments of the above-defined method of the second aspect of the invention may be the same as or correspond to any respective ones of the above- or below-defined specific features of embodiments of the device of first aspect of the invention.

In some practical embodiments of the above-defined method of the second aspect, the method may comprise forming the optical structure, having the said plurality of portions of the record or encoded representation of the complete optically variable image recorded or encoded therein, as an optical security feature, and either simultaneously or subsequently to that recording or encoding incorporating the said optical security feature into an item or object whose security, authentication or identification is required.

However, in other practical embodiments of the above-defined method of the second aspect, the method may comprise forming the optical structure, having the said plurality of portions of the record or encoded representation of the complete optically variable image recorded or encoded therein, as a discrete optical security device or security element, and the method may further comprise a step of applying, affixing or incorporating the optical security device or element onto or into the structure of an item or object whose security, authentication or identification is required.

Thus, in various practical embodiments of the above-defined production method, the aforementioned (i) recording or encoding, and (ii) incorporation or application/affixation/incorporation steps may be carried out in any order relative to each other. Thus, in various such embodiments, the step of incorporating the recorded/encoded image-containing optical structure into the item or object may be carried out either:

(a) substantially simultaneously with the recording/encoding step itself, or alternatively (b) subsequent to the recording/encoding step itself.

Further alternatively, it may in yet other embodiments be possible for the step of incorporating the recorded/encoded image-containing optical structure onto or into the item or object may be carried out prior to the recording/encoding step itself.

In a third aspect of the present invention there is provided a method of authenticating or identifying an item or object having applied or affixed thereto or incorporated into the structure thereof an optical security device according to the first aspect of the invention or any embodiment thereof, the method comprising:

(a) reconstructing the said plurality of portions of the complete optically variable image recorded or encoded in the optical structure of the device; and (b) viewing one or more of the said plurality of reconstructed portions of the complete image.

In those embodiments of the above authentication or identification method which utilise an embodiment optical security device in which:

the optical structure has recorded or encoded therein a representation of the optically variable image in the form of a plurality of discrete portions of the complete image to be reconstructed, and:

(i) each respective one of the said plurality of portions of the optically variable image can, when reconstructed, only be viewed by viewing the respective said image portion at or over a respective viewing angle or angle range relative to the optical structure and/or angle or angle range of illumination of the optical structure which is different from the viewing angle/angle range and/or angle/angle range of illumination at or over which at least one other of the said image portions is viewable when reconstructed; or (ii) the respective viewing angle/angle range and/or angle/angle range of illumination at or over which a, or any, given one of the image portions can be viewed, when reconstructed, may be substantially the same viewing angle/angle range and/or angle/angle range of illumination at or over which at least one other of the said image portions, but not all of those other said image portions, (optionally or at least some of, but not all of, the remaining reconstructed image portions) is/are viewable when reconstructed; or (iii) the respective viewing angle/angle range and/or angle/angle range of illumination at or over which a, or any, given one of the image portions can be viewed, when reconstructed, may be substantially different from the respective viewing angle(s)/angle range(s) and/or angle(s)/angle range(s) of illumination at or over which at least one other of the of the reconstructed image portions (optionally or at least some of the remaining reconstructed image portions) is/are viewable; the viewing step (b) may comprise:

(bi) viewing the or each respective one of the plurality of reconstructed portions of the complete optically variable image at or over, or only at or over, the or the respective viewing angle or angle range relative to the optical structure, and/or by illuminating the optical structure at or over the respective angle or angle range of illumination, that is associated with that respective reconstructed image portion of the complete image; and/or (bii) viewing respective ones of the plurality of reconstructed portions of the complete optically variable image at or over, or only at or over, respective ones of the plurality of different viewing angles/angle ranges and/or angles/angle ranges of illumination of the optical structure;

whereby the complete reconstructed optically variable image is viewable in its totality—which is to say, all the portions of the complete reconstructed image are each respectively reconstructable and viewable (e.g. in a sequentially manner)—by, or only by:

(ci) viewing the or each respective portion thereof at or over, or only at or over, the or the respective viewing angle/angle range and/or angle/angle range of illumination of the optical structure that is associated with that respective image portion, and/or

(cii) viewing respective ones of the plurality of reconstructed portions thereof at or over, or only at or over, the respective ones of the plurality of different viewing angles/angle ranges and/or angles/angle ranges of illumination of the optical structure, as the case may be.

In the practising of many embodiments of the invention, the recorded or encoded optically variable image, or respective portions thereof, may be reconstructable by illumination of the optical structure, or a respective part or portion or region thereof, by electromagnetic radiation, especially electromagnetic radiation of a wavelength/frequency appropriate to the means used to record/encode and/or intended for reconstructing the image. Especially suitable electromagnetic radiation may be light in the visible region of the electromagnetic spectrum. Such visible light may for example have wavelengths in the approximate range of from about ~380 nm up to about ~780 nm.

As used herein, the term "image" is intended to be construed broadly, as encompassing not only visually perceptable "images" in the conventional sense, i.e. comprising one or more visually perceivable graphic or verbal (e.g. alphanumeric or pictorial or mathematical or linguistic) elements or characters or indicia or group(s) thereof, but also encompassing any other perceivable or detectable physical indicia or representation of any physical indicia that may serve a security, authentication or identification purpose.

Thus, as used herein, the term "viewing" as applied to the viewing of at least a portion of the reconstructed image is to be construed broadly as encompassing not only visual viewing thereof by one or more eyes of a human observer, but may also include detecting at least a portion of the image using an optically sensitive device, e.g. a camera, optionally in combination with suitable image processing hardware and/or software.

In some embodiments of the invention the viewing of a first one of the plurality of portions of the reconstructed image may comprise a first viewing step or operation in which that first portion, or that first portion only, of the reconstructed image is viewed. If desired or appropriate, in some such embodiments the viewing may further comprise one or more additional or further viewing steps or operations in each of which a respective additional or further one of the plurality of portions, or a respective additional or further one only of the plurality of portions, of the reconstructed image is viewed. In each of the aforementioned viewing steps or operations the viewing of each respective portion of the reconstructed image may, in some of the embodiments defined hereinabove, be carried out by viewing each respective portion of the image at or over a given, or at the unique, viewing angle or angle range relative to the optical structure and/or by illuminating the optical structure at or over a given, or at the unique, angle or angle range of illumination that is associated with that respective image portion.

Thus, in some embodiments of the invention the overall complete reconstructed image may be of such a size, substantially greater than that of the parts of the optical structure in which are recorded or encoded the various portions of the image, that it may only be viewable in its entirety upon a plurality of individual or discrete viewing steps or operations being carried out, each such viewing step or operation being such as to view a respective portion, or a respective portion only, especially a respective discrete portion or respective discrete portion only, of the complete reconstructed image, and further especially a respective discrete portion only of the complete reconstructed image independently of the viewing of any of the other portion(s) of the complete reconstructed image.

In particular, in some of the above-defined embodiments where plural portions of the complete reconstructed image are viewable independently of each other, the viewing of the complete reconstructed image may be accomplished e.g. by illuminating corresponding respective portions of the recorded or encoded image in a plurality of discrete illumination steps or operations. Alternatively (or perhaps even additionally), the viewing of the complete reconstructed image may be accomplished by illuminating the recorded or encoded image, especially sequentially, in a series of discrete viewing steps or operations, at or over a respective selected one of a plurality of different angles of incidence or ranges of angles of incidence of the incoming light, such that each respective incident angle or angle range corresponds to and enables the viewing of a respective portion of the reconstructed image at or over a respective different viewing angle/angle range relative to the optical structure. In some such embodiment forms, the viewing of the complete reconstructed image may even be accomplished by illuminating the recorded or encoded image over a spread or extended range of angles or angle ranges of incidence of the incoming light, such that as the angle or angle range of incidence varies across that spread/extended range the complete reconstructed image is viewable in segments or stages or portions thereacross.

Thus, in the practising of certain ones of such embodiments, for viewing the complete reconstructed image a moveable light source may be used, which is to say a light source whose angle of incidence relative to the optical structure of the device is variable in at least one dimension, direction, axis or plane relative thereto. For this purpose such a light source may for example be a hand-held light source, so it may be manipulated by a user/viewer who wishes to view the overall reconstructed image for the said security, authentication or identification purpose. Alternatively the light source may be moveable mechanically.

In many practical embodiments of the invention, the optical structure of the device in which the holographic image is recorded may be, or may be contained within or on, a body of optically active material, which is to say, a material which is able to modify optical properties of incident light, such as its phase, amplitude, velocity or polarization, etc, which property modification may be effected upon reflection and/or transmission of the incident light. The body of optically active material may be of any suitable size, shape and configuration. In some embodiments for example, the body of optically active material may be substantially planar or in the form of a sheet or plate or film or layer of the relevant material, having the recorded or encoded image contained therein or thereon. However, in other embodiments the body of optically active material may be curved or arcuate or have at least one surface or face which is curved or arcuate. In other embodiments still, the body of optically active material may have substantial thickness such that the body takes the form of a block or cuboid. The optically active material of the body may be any suitable such material, as are conventionally used for the recording or encoding of holographic images using conventional holographic technology.

It may be a feature of some practical embodiments of the invention that the size, in at least one dimension, direction, axis or plane, of a or a respective given one of the viewable portion(s) of the reconstructed image may be greater than the corresponding size, in the same, or the respective same, dimension, direction, axis or plane, of a part of the optical structure having the corresponding or corresponding respective optically variable image portion recorded or encoded therein—or, put another way, the size, in at least one dimension, direction, axis or plane, of a given part of the optical structure having a or a respective one of the optically variable image portion(s) recorded or encoded therein may be smaller than the corresponding size, in the same, or the respective same, dimension, direction, axis or plane, of the or the respective viewable portion of the reconstructed image.

In such embodiments, the said at least one dimension, direction, axis or plane may be any such dimension, direction, axis or plane which allows for the or the respective recorded or encoded image portion of the structure and the or the respective reconstructed image portion to be different in size. In some such embodiments the at least one dimension, direction, axis or plane in which the aforementioned size difference is defined may be a dimension, direction, axis or plane contained within the body of the optical structure itself.

For example, in some such embodiment forms the size differential between the or the respective recorded or encoded image portion of the structure and the or the respective reconstructed image portion may be defined in either of a length or a width direction of and within a general plane of the optical structure.

In various such embodiments of the invention the size differential of the or the respective reconstructed image portion relative to the or the respective recorded or encoded image portion of the structure may be any multiple, including any whole number or fractional multiple, greater than 1. For example, the size of the or the respective reconstructed image portion may be any of >1 times, or 2 times, or ≥3 times, or ≥4 times, or ≥5 times, or ≥6 times, or ≥7 times, or ≥8 times, or ≥9 times, or ≥10 times, or perhaps even as much as ≥12 or ≥13 or ≥15 or ≥18 times or even ≥20 times, the size of the or the respective recorded image portion of the structure—i.e. that part, or portion or region, of the structure that contains or comprises the respective recorded or encoded image portion (any of which ranges include fractions as well as whole number multiples).

In some embodiment forms of the optical device of the invention, the optical structure in which the characteristic hologram or other recorded or encoded representation of the optically variable image is recorded or encoded may be, or may be comprised in a body of optically active material that is, of any shape, size and configuration. The part or parts of the optical structure in which the recorded or encoded image is so recorded or encoded may be or represent only a portion or region of the whole thereof, whereby the optical structure may have the recorded or encoded image so recorded or encoded in only a portion or region of the overall optical structure that is less than, optionally significantly less than, its whole—either in terms of its thickness and/or its facial area. Alternatively, however, in other embodiment forms, the optical structure may instead have the image recorded or encoded in or throughout substantially the whole of its volume (or thickness) and/or its facial area.

In some example forms the optical structure may be, or may be comprised in a body of optically active material that is, in the form of a strip or stripe, especially an elongate strip or stripe of relatively small thickness—e.g. in a thickness range of from about 0.1 or 0.5 or 1 or 5 or 10 up to about 100 or 200 or 300 or 400 or 500 or 800 or 1000 μm—with a facial width that is smaller than its length. Its width may be either generally substantially constant, or alternatively may be variable along the length of the strip or stripe. Such a strip or stripe may for example be generally straight or curved in configuration, and/or it may be formed by a combination of a plurality of variously shaped graphical regions or shapes or patterned regions or portions.

In some alternative embodiments however the optical structure may take other physical forms or shapes, for example it may be in the form of a circular, elliptical, polygonal (e.g. rectangular) or other regularly or irregularly shaped patch, land, region, portion, layer or body of the optically active material in which the holographic image is recorded or encoded. Nevertheless, when the optical structure takes such other physical forms or shapes it may likewise have a thickness in the range of from about 0.1 or 0.5 or 1 or 5 or 10 up to about 100 or 200 or 300 or 400 or 500 or 800 or 1000 μm. In some embodiments the hologram or other recorded or encoded representation of the optically variable image may be distributed across either substantially the whole of the width of the strip or stripe (or other shaped portion or region of the optical structure) and/or along at least a portion of its longitudinal length. Alternatively, however, the hologram or other recorded or encoded representation of the optically variable image may be distributed across only a portion of the width of the strip or stripe (or other shaped portion or region of the optical structure) and along a portion, or along at least a portion, of its longitudinal length.

In some embodiments of the invention the strip or stripe (or other shaped portion or region of the optical structure) containing the hologram or other recorded or encoded representation of the optically variable image may further comprise one or more additional or auxiliary security features, especially one or more further or auxiliary optical security features, such as may be already known per se in the art, and formed for example by appropriate optical elements or portions comprising modulations of the strip/stripe's surface, volume or internal optical properties. Such auxiliary optical security features may include for example any suitable form and number of overt or covert features, e.g. graphics, holograms, micro- or nano-graphics, diffractive or non-diffractive images and structures, hidden images, and suchlike.

In various such embodiments the hologram or other recorded or encoded representation of the optically variable image may share a given area or region or portion of the strip or stripe (or other shaped portion or region of the optical structure) with any such auxiliary optical security feature(s) contained therein in various ways, such as by the hologram or other recorded or encoded representation of the optically variable image occupying a portion of the strip or stripe (or other shaped portion or region of the optical structure) exclusively, or it may be interlaced with, or superimposed upon, or trapped or enshrouded beneath, one or more such auxiliary security feature(s).

In some such embodiments of the invention it may even be advantageous for a plurality of, even several, such auxiliary optical security features to be included in the strip or stripe (or other shaped portion or region of the optical structure) in order to make it more difficult for a casual observer or viewer to discern therein the presence of the characteristic recorded or encoded hologram that underpins this invention, especially when the image it records or encodes is reconstructed and an observer views it under conditions in which a significant proportion of the reconstructed image is not visible and/or its presence may not be suspected.

Within the scope of this specification it is envisaged that the various aspects, embodiments, examples, features and alternatives, and in particular the individual constructional or operational features thereof, set out in the preceding paragraphs, in the claims and/or in the following description and accompanying drawings, may be taken independently or in any combination of any number of same. For example, individual features described in connection with one particular embodiment are applicable to all embodiments, unless expressly stated otherwise or such features are incompatible.

BRIEF DESCRIPTION OF THE DRAWINGS

Some embodiments of the invention in its various aspects will now be described in detail, by way of example only, with reference to the accompanying drawings, in which.

DETAILED DESCRIPTION OF EMBODIMENTS

Figure 1:
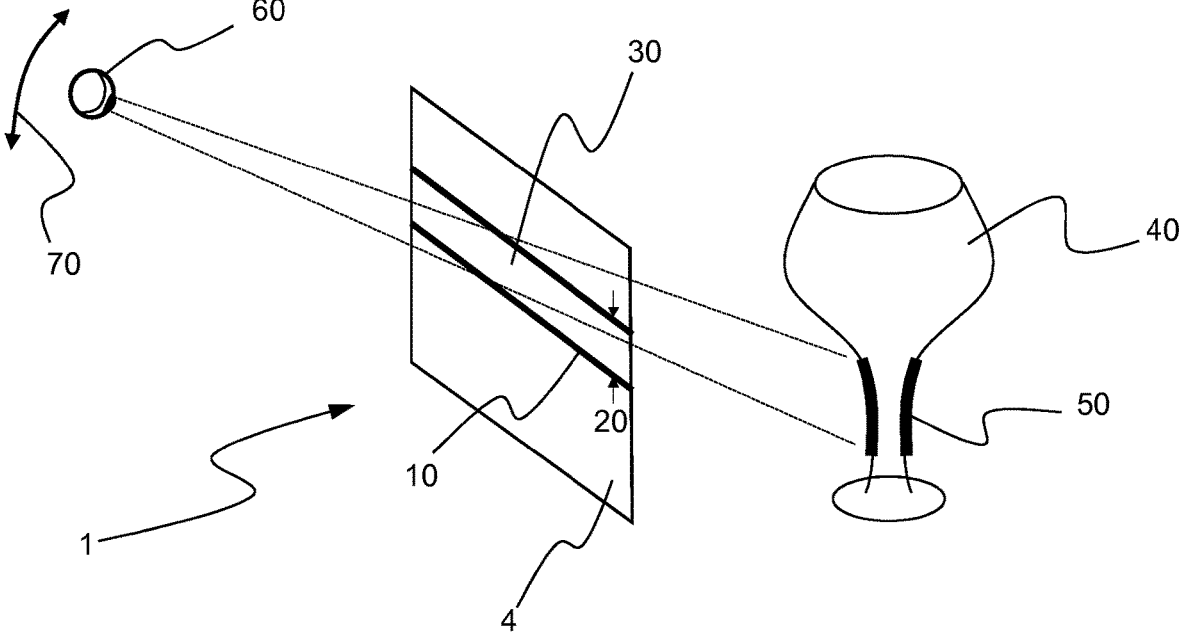
FIG. 1 is a perspective schematic view of an optical arrangement or system incorporating an optical security device according to one embodiment of the invention, showing the general arrangement of the arrangement or system's main features and the manner in which one given portion of the security image is reconstructable and viewable.

Referring to FIG. 1, this shows a schematic representation of an optical system, in accordance with an example embodiment of the invention, for reconstructing a holographic image recorded in an optical structure of a security device, in which the reconstructed image is significantly larger in size than the actual recorded image, i.e. that portion of the optical structure which has the recorded image recorded within it. This FIG. 1 is actually a "snapshot" representation of the optical structure and one portion only of the complete security image—namely the stem portion only of a complete wine glass—in the process of being reconstructed and viewed.

As shown in FIG. 1, a security device 1 comprises a generally planar body 4, e.g. a sheet or film or other relatively thin layer, of optically active material comprising a recorded or encoded optically variable image within an optical structure 30 contained in an area or region of the body 4 preferably elongated in one (i.e. a side-to-side longitudinal) direction, such as in the form of a stripe 10. The optical structure 30 contains an encoded holographic image recorded therein, which in this illustrative schematic example is a recorded or encoded representation of an image of a wine glass 40. Upon reconstruction of the image encoded in the structure 30 by incident light, the reconstructed image 40 appears to be floating in space out of (i.e. behind) the structure plane of the optical structure-containing stripe 10, and its characteristic size is several times larger than the optical structure-containing stripe 10 in which the optically variable holographic image is recorded, i.e. several times larger than that portion of the stripe 10 in which is recorded the optically variable holographic image, at least in the stripe 10's smaller width dimension 20. As a result, the reconstructed holographic image 40 can be viewed in its entirety only when an observer 60 changes its/their viewing angle 70 typically in the plane of the shorter dimension 20 of the optical structure-containing stripe 10.

By way of example, the width of the stripe 10 may be relatively narrow, such as of the order of approximately 1 to 3 mm, e.g. around ~1 mm, whereas the corresponding width, in the same dimension/direction, of the reconstructed image 40 may be relatively wide or tall, such as of the order of approximately 1-5 cm, e.g. around ~1 cm. This size differential thus enables only a minor proportion 50 of the reconstructed image 40 to be viewable by an observer 60 at any single given viewing position or angle (relative to the device's structure plane). Moreover the size of the reconstructed image 40 may be independent of the size of the hologram 30 itself. Furthermore, it may be noted that the size of the reconstructed image 40 may be independent of the distance between the observer 60 and the plane of the optical structure (stripe) 10, although the size (and/or extent, relative to the whole) of the visible portion 50 of the reconstructed image 40 may be dependent on that viewing distance.

Thus, and in accordance with embodiments of this invention, under normal viewing conditions by the observer 60 only a relatively small or partial portion—e.g. that represented by the portion 50, that being the stem of the wine glass—of the complete reconstructed image 40 (i.e. the complete wine glass) is viewable by the observer 60 at a single given viewing angle, as represented by the viewer 60's as-drawn current position shown in the drawing.

Thus, if the observer 60 wishes or needs to view other portions of the complete image 40—i.e. other portions of the wine glass—then they need to do so at other respective different viewing angles (not shown in the drawing), whereby other parts of the wine glass, e.g. its bowl or its base, can only be viewed at such respective other viewing angles.

The characteristic feature of the invention that the reconstructed image needs to be larger (in a corresponding, or respective corresponding, direction, dimension, axis or plane) than the optical structure in which it is recorded or encoded, so that the observer is able to see only a relatively small or partial portion of the image (for example as described in the three preceding paragraphs, in the context of one illustrative embodiment), also implies that the designer of optical security devices embodying the present invention generally may need to take into consideration an intended or optimum viewing distance when designing the size of the reconstructed image and the size of the optical structure. At the intended or optimum viewing distance from the optical structure (as determined also by the designer), i.e. at the intended or optimum location of the observer, the angular size of the reconstructed image may need to be a multiple (e.g. an integer multiple greater than 1 or a fractional multiple (i.e. other than a whole number) greater than 1) of the angular size of the optical structure in the corresponding direction, dimension, axis or plane. (In general terms, by "angular size" is meant the angle under which an object is viewable or viewed at a specific distance from it.) For example, in many embodiments of the invention the angular size of the reconstructed image may be any of ≥1 times, or ≥2 times, or ≥3 times, or ≥4 times, or ≥5 times, or ≥6 times, or ≥7 times, or ≥8 times, or ≥9 times, or ≥10 times, or perhaps even as much as ≥12 or ≥13 or ≥15 or ≥18 times or even ≥20 times (which ranges include fractional multiples as well as whole number multiples), the angular size of the optical structure when viewed from the same location and/or viewing distance therefrom.

The basic stripe 10 may be formed as a standard security device as is often incorporated into printed documents or securities, such as banknotes, transportation tickets, event or other tickets, tax stamps, credit and debit cards, passports, visas, ID cards, or authentication features of branded (e.g. "luxury") goods. Such a stripe 10 may be straight, curved, or formed by a combination of various graphical shapes, or otherwise structured, while its width 20 is characteristically smaller than its longitudinal length. The width of the stripe 10 can be constant or variable along the length of the stripe 10. Alternatively, such a stripe in which the holographic image is recorded or encoded may instead take a different overall geometric form, such as a circular, elliptical, polygonal or other regularly or irregularly shaped patch, land, region or portion of the body 4 of the optically active material.

Figure 2:
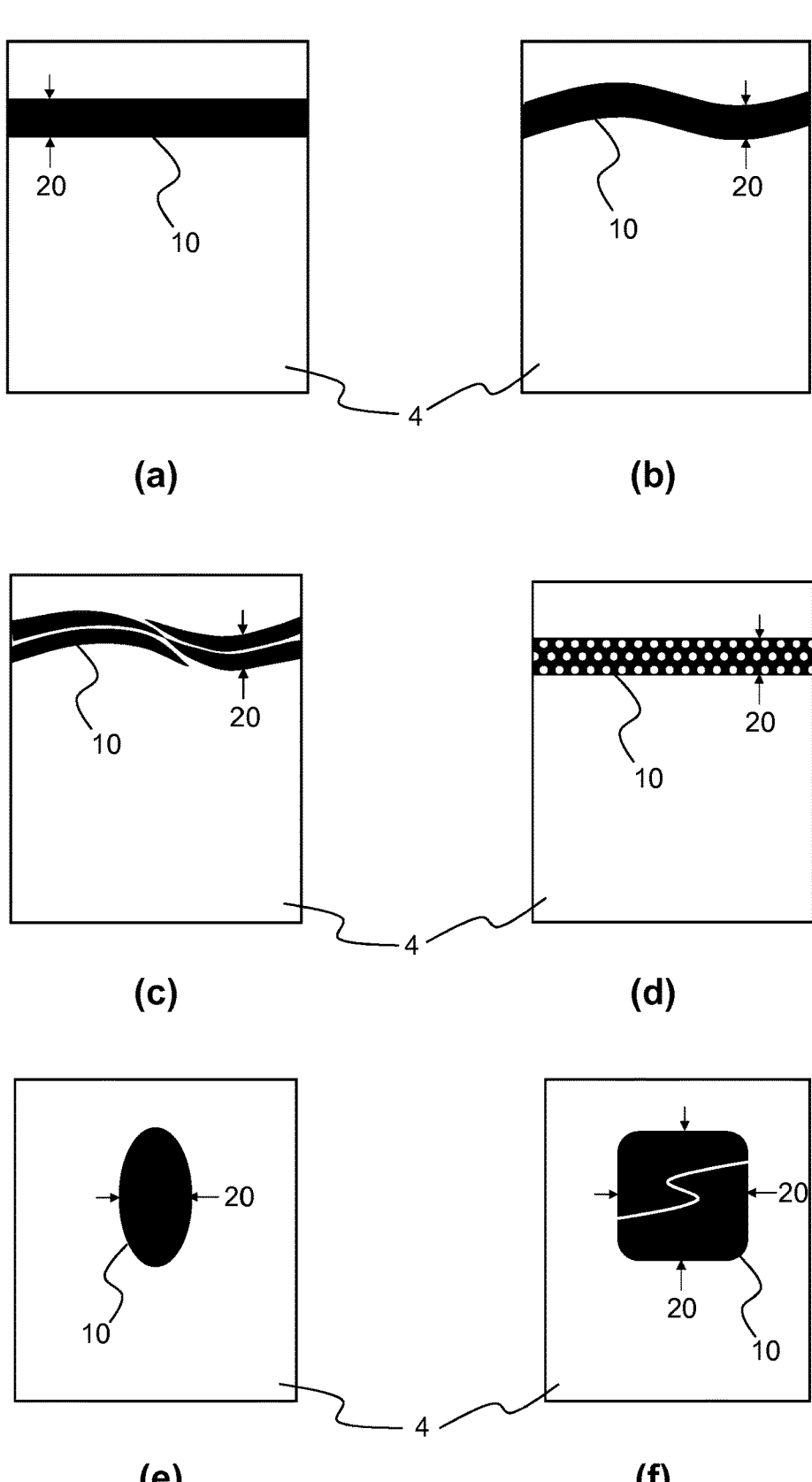
FIGS. 2(a), (b), (c), (d), (e) and (f) are face-on views of various schematic examples of other optical security features containing various different configurations of optical structure for incorporating recorded or encoded holographic security images for reconstruction and viewing, for use in optical security devices according to various embodiments of the invention.

Some examples of such various configurations and arrangements of stripes or patches or lands 10 in which the hologram or other recorded or encoded representation of the optically variable image is contained are illustrated in FIGS. 2(*a*)-(*f*).

In addition to the characteristic holographic image 30 recorded or encoded in the optical structure of the stripe or patch or land 10, the stripe or patch or land 10 may further contain any number of, even a large number of, conventional auxiliary security features such as any suitable known overt or covert features, e.g. graphics, holograms, micro- or nanographics, diffractive or non-diffractive images and structures, hidden images, holograms, and suchlike. These features may be incorporated into the material of the stripe or patch or land 10 in a conventional manner, e.g. typically in a form of modulation of its surface, volume or optical properties. The presence of these auxiliary security features, at least one or more of which may for example be more readily visible to the naked eye than any portion of the reconstructed image of the characteristic recorded holographic image which characterises embodiments of this invention, may be useful in making it more difficult for a casual observer or viewer to discern the presence in the stripe or patch or land 10 of the characteristic recorded image recorded or encoded in the optical structure 30 central to this invention, especially when viewed under conditions in which a significant proportion of the reconstructed image 40 is not visible and/or its presence may not be suspected.

Thus, the hologram structure 30 contained in the stripe or patch or land 10 contains a recorded or encoded image which, when reconstructed, is located out of the hologram plane—which is to say, in front of or behind the general plane of the hologram structure 30 within the stripe, patch or land 10 (or the body 4), and at such a distance from that plane that only a minor portion 50 of the complete reconstructed image 40 in the direction of the stripe, patch or land width 20 can be viewed by an observer 60, as illustrated schematically in FIG. 1.

In practising some embodiments of the invention the observer 60 may be positioned relative to the hologram structure 30 at a suitable optimum distance therefrom to allow a correct viewing of the portion 50 of the reconstructed image 40, which distance may be termed a "standard observing distance". In some practical example embodiments that distance may be of the order of from around 10 or 15 to around 30 cm, e.g. around 25 cm. By moving the observer 60's position in a direction 70 generally parallel to the stripe width 20, the observer 60 can see different minor portions 50 etc of the overall image 40 and eventually—once the observer's viewing position has covered a sufficient distance—recognise the object the overall reconstructed holographic image 40 represents.

In further developed forms of some embodiments of the invention, the hologram structure 30 may be designed in such a way that under standard, everyday office or daylight lighting conditions the reconstructed holographic image 40, or any given portion thereof, is itself not clearly recognisable—for example it may be designed to be blurred or otherwise disguised, hidden or camouflaged under such conditions. However, at the same time it may be so designed that only once the hologram has been illuminated by a predetermined "correct" lighting condition, e.g. using a "point" light source—i.e. a source with a real or virtual emitting area significantly smaller (typically at least 10×) relative to the distance from illuminated object, or a source emitting collimated or quasi-collimated light—does the reconstructed image, or any given portion thereof, becomes recognizable, e.g. sharp or focused enough, to be recognisable. Such a "point" light source may be defined as one whose notional source is for most practical purposes able to be considered as being at infinity, i.e. one whose rays are generally approximately parallel to one another.

In practising such further developed embodiment forms of the invention it may be up to the hologram designer, i.e. the person skilled in the art, to determine the optimum observation conditions—e.g. white vs. monochromatic light, illumination angle, observation angle, "standard" (i.e. optimum) observation distance—and to choose an appropriate object (or objects) to be recorded or encoded into the structure 30, such as whether a 3-D object or a string of 2D characters or text, or even a combination of multiple such objects. The hologram structure 30 may also be designed such that it reveals different object images when illuminated or observed from different specific directions or with the use of monochromatic or quasi-monochromatic (i.e. of a narrow wavelength bandwidth, e.g. typically <20 nm wide, or perhaps even as narrow as <1 nm wide, as is the case with many lasers) light or a combination of plural light sources of different wavelengths (or frequencies).

Figure 3:
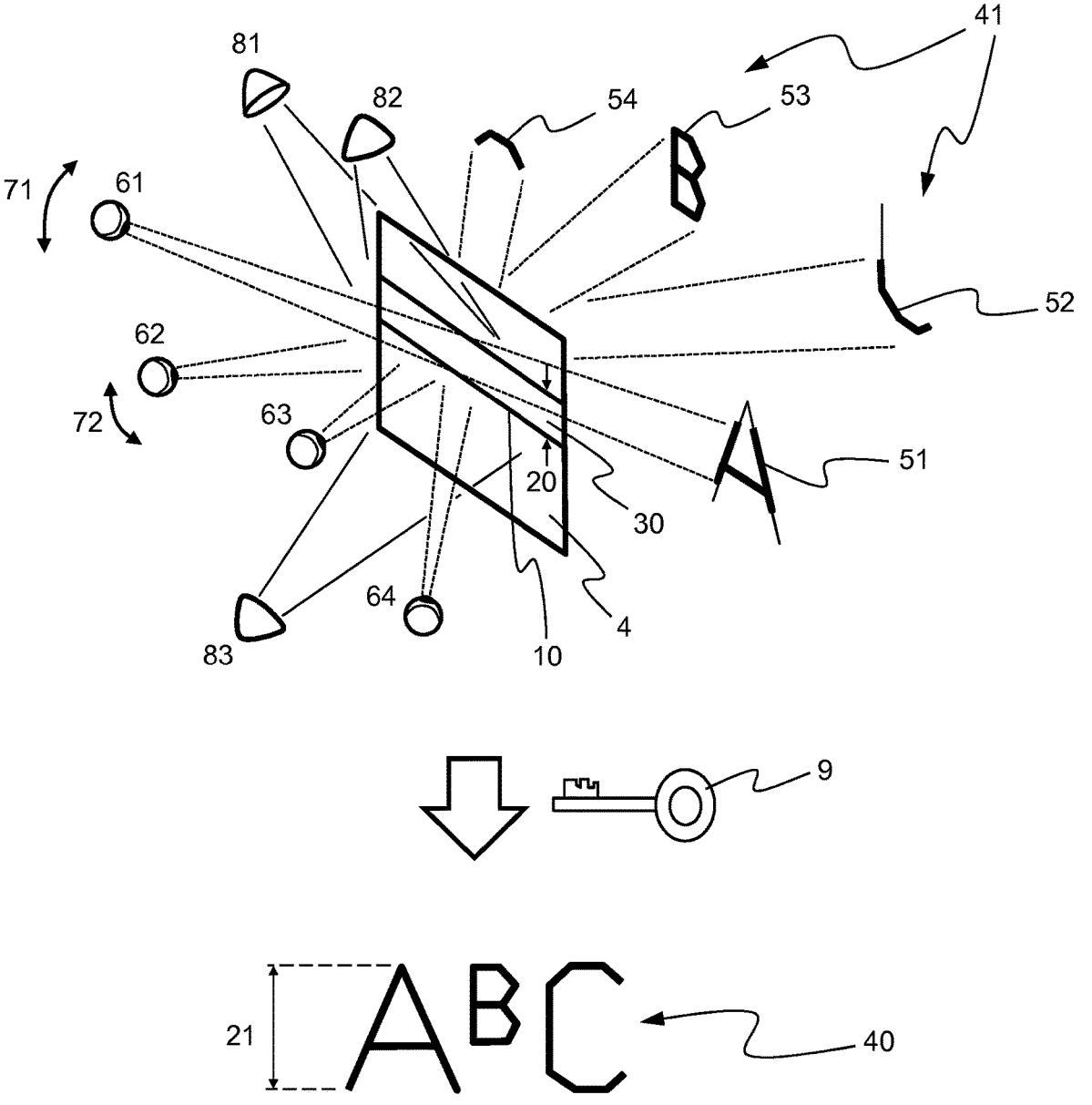
FIG. 3 is a perspective schematic view of a more advanced optical arrangement or system incorporating an optical security device according to another embodiment of the invention, showing the general arrangement of the arrangement or system's main features and illustrating the manner in which a complete plural-component security image is reconstructable from its component portions, and viewable as the complete reconstructed image, by independent illumination and viewing of the recorded image at different respective illumination and viewing angles.

Turning to FIG. 3, here there is shown a more advanced optical arrangement or system embodying the present invention, in which plural portions of a holographic image are observed at respective different predetermined configurations of the light source, viewer and optical structure. The FIG. 3 also illustrates the manner in which, in this example embodiment, in contrast with the simpler and more basic embodiment of FIG. 1, the portions of the reconstructed image may be combined into a complete final image using a predetermined key (e.g. an algorithm).

As shown in FIG. 3, a security device 1 comprises a planar body 4, e.g. a sheet or film or other relatively thin layer, of optically active material comprising an optically variable image-containing optical structure 30 contained in an area or region elongated in one direction, such as in the form of a stripe 10. The optical structure 30 contains an encoded holographic image recorded therein, which in this illustrative schematic example is an image of three letters "ABC" 40. This image cannot be viewed in a simple sequence of viewing steps, for example only by changing the viewing angle as shown in the embodiment of FIG. 2.

Instead, in this embodiment plural predetermined configurations of light sources 81, 82, 83 and of plural viewers 61, 62, 63, 64 in combination with respective viewer motions 71 and 72 and the hologram structure 30 have to be used to reconstruct respective plural portions of the holographic image 51, 52, 53, 54, which are respective portions of the three letters "ABC" 41.

In more detail, the first viewing step comprises using a light source 81 configured to illuminate structure 30 and to reconstruct the letter "A" and the top of the letter "C", a viewer 61 being positioned at a predetermined location so as to be able to view a portion of this letter 51, and using motion 71 (i.e. a predetermined continuous sequence of viewing steps) the viewer eventually views the entire letter.

The next viewing step comprises using the same configuration of the light source 81 (reconstructing the letter "A" and the top portion of the letter "C"), and the viewer 64 then is re-positioned to a different predetermined location so as to be able to view the top portion of the letter "C" 54 in its entirety.

The following viewing step comprises using light source 82 configured to illuminate structure 30 to reconstruct the letter "B", the viewer 63 now being re-positioned again to a different predetermined location so as to be able to view the whole letter "B" 53.

The last sequence of viewing steps comprises using light source 83 configured to illuminate structure 30 to reconstruct the central and bottom portions of the letter "C", the viewer 62 now being re-positioned to another predetermined location so as to be able to view a portion of the letter "C" 52, and using motion 72 (i.e. a predetermined continuous sequence of viewing steps) the viewer eventually views the entire central and bottom portions of the letter "C".

The complex nature of the viewing process (as described by way of example above) may require certain guidance. In fact, in the case of the described embodiment of the invention being used as a security feature, it is highly desirable that the sequence of viewing steps requires such a guidance, without which the sequence cannot be determined or guessed easily or not at all. The guidance may be provided by a designer in the form of a viewing algorithm comprising a predetermined sequence of viewing steps and viewing configurations (i.e. all necessarily predetermined viewing conditions). Performing the viewing steps according to such an algorithm will thus ensure that all the portions of the holographic image are viewed, and viewed correctly.

However, as can be also derived from FIG. 3, being able to view all portions of the holographic image may not be enough to recognise the entire object represented by these portions, since in the case of the described embodiment, these portions 41 are "dislocated" or "scrambled" when compared to the proper appearance of the final image 40. According to the viewing steps described above, the portions 41 are viewed in full—however, for the viewer they appear in locations which do not correspond to the locations of the respective portions in the final image 40. Therefore, a further key 9—in addition to the viewing algorithm—is required in order to put viewed portions of the image into a proper order and/or positions and so to obtain the final representation of the complete recorded image. This additional operation may be done either by a mental process of a person performing the viewing, or by a viewing device in which such an operation is programmed, or by a combination of both. Again, the key 9 defining how to compose the viewed portions of the holographic image 51, 52, 53, 54 into the final complete reconstructed image 40 may be provided by the designer.

Not all algorithms are necessarily complex and/or an additional key 9 may not even be required—for example, as is the case illustrated in FIG. 1, where such an algorithm is very simple and effectively consists only of the steps of configuring a light source to reconstruct the image 40, and of a continuous sequence of viewing steps describing changing the position 70 of the viewer 60 in order to view all the portions 50 of the reconstructed image 40 so that the object represented by the image is recognised. However, the higher complexity of an embodiment of the invention, the higher level of security it may provide in security applications.

Figure 4:
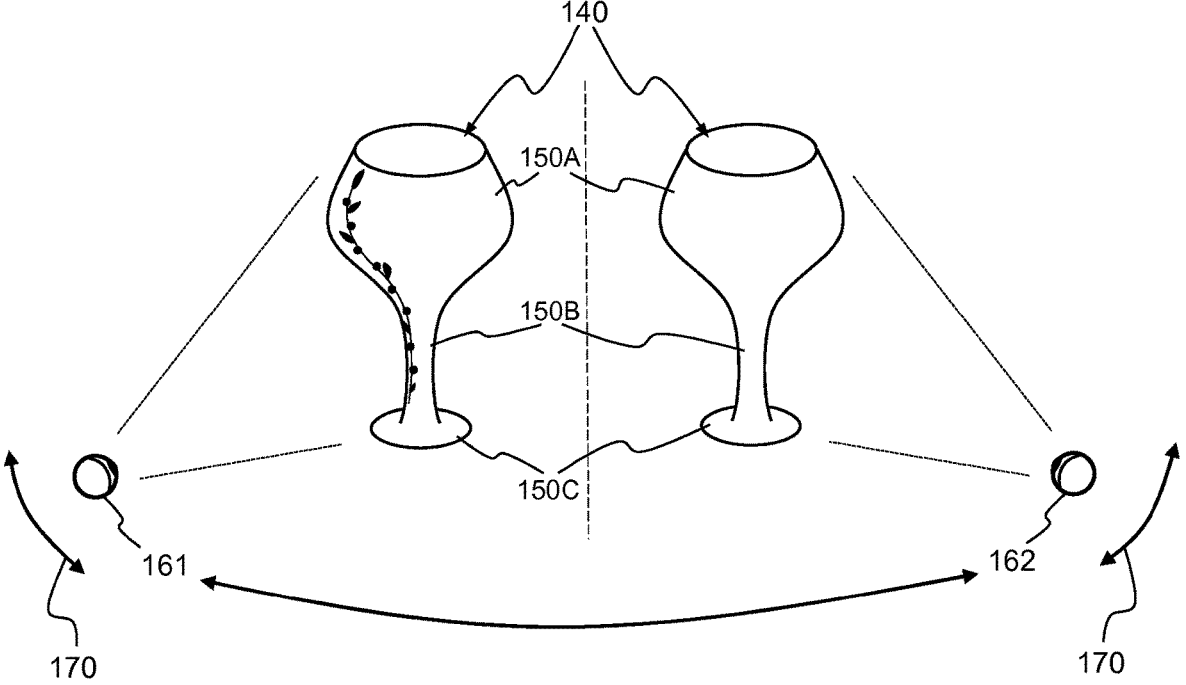
FIG. 4 is a perspective schematic view of another optical arrangement or system embodying an example optical security device of the invention, showing in general terms the manner in which different portions of a given three-dimensional image recorded/encoded in the device are reconstructed and viewed from different viewing angles.

FIG. 4 illustrates schematically the viewing of different portions 150A, 150B, 150C (in this case the bowl, stem and base of a wine glass) of a given complete three-dimensional image 140 (in this case the complete wine glass) from different viewing angles. This complete image 140 may be considered to be the same complete image of a wine glass as recorded in the strip 20 shown in FIG. 1. The image 140 in this example is composed of three discrete portions: namely the bowl 150A, stem 150B and base 150C. In this embodiment all three portions 150A, 150B, 150C are seamlessly connected. To view each portion 150A, 150B, 150C in full, plural viewing angles have to be applied when viewing each said portion: namely at least a range of viewing angles from left to right, corresponding to the illustrated viewing positions 161 and 162, and possibly in combination with a vertical range of viewing angles 170 (which correspond to those 70 as shown schematically in FIG. 1).

Taking the arrangement of FIG. 1 a developmental stage further, in an alternative example the image of the complete wine glass 140 could for instance be formed from six portions: i.e. left and right sides of the bowl, left and right sides of the stem, and left and right sides of the base. In such a case, a single viewing angle (from left or right) may be sufficient to view each discrete portion in full.

The above-described embodiments of security features according to the invention thus represent a novel way to provide a covert security feature, yet one which is recognisable by an observer with little in the way of extraneous equipment. For example, in one practical scenario (as in the embodiment of FIG. 1) the stepwise or stagewise viewing and recognition of the complete reconstructed image 40 may be accomplished by means of a simple illumination device such as, for example, a flashlight or a lighting app incorporated into a smartphone. It also enables the incorporation into a given narrow strip or stripe 10 a potentially significantly larger reconstructed image than has hitherto been possible or obvious to do (e.g. easily 5 to 10 times greater than the size of the hologram), thereby leading to improved levels of security or authentication capability through the forcing of the observer to go to greater lengths in viewing and identifying individual and relatively smaller (in comparison with the whole) portions of the overall complete reconstructed image 40.

Throughout the description and claims of this specification, the words "comprise" and "contain" and linguistic variations of those words, for example "comprising" and "comprises", mean "including but not limited to", and are not intended to (and do not) exclude other moieties, additives, components, elements, integers or steps.

Throughout the description and claims of this specification, the singular encompasses the plural unless expressly stated otherwise or the context otherwise requires. In particular, where the indefinite article is used, the specification is to be understood as contemplating plurality as well as singularity, unless expressly stated otherwise or the context requires otherwise.

Throughout the description and claims of this specification, features, components, elements, integers, characteristics, properties, compounds, chemical moieties or groups described in conjunction with a particular aspect, embodiment or example of the invention are to be understood to be applicable to any other aspect, embodiment or example described herein unless incompatible therewith or expressly stated otherwise.

The invention claimed is:

1. An optical security device comprising a recorded or encoded representation of an optically variable image, the image being reconstructable and viewable for security, authentication or identification purposes, the device comprising:

an optical structure in which there is recorded or encoded a representation of the optically variable image in a form of a plurality of portions of a complete said image to be reconstructed, wherein respective ones of said plurality of portions of the optically variable image can, when reconstructed, only be viewed in their totality by viewing said complete image (i) at or over a plurality of different viewing angles or angle ranges relative to the optical structure, or (ii) at or over a plurality of different angles or ranges of angles of illumination of the optical structure, or both (i) and (ii), and wherein a size, in at least one dimension, direction, axis or plane, of a complete reconstructed image is greater than the corresponding size, in same, or respective same, dimension, direction, axis or plane, of a part of the optical structure having said plurality of portions of the image collectively recorded or encoded therein.

2. The optical security device according to claim 1, wherein the optical structure has recorded or encoded therein a representation of the optically variable image in the form of a plurality of portions of the complete image to be reconstructed, wherein each respective one of some or all of said plurality of portions of the optically variable image can, when reconstructed, only be viewed in full by viewing a respective image portion (iii) at or over a respective range of viewing angles relative to the optical structure, or (iv) at or over a range of angles of illumination of the optical structure, or both (iii) and (iv).

3. The optical security device according to claim 2, wherein either:

(a) each respective one of some or all of said plurality of portions of the optically variable image can, when reconstructed, only be viewed in full by viewing said respective image portion (iii) at or over the respective range of viewing angles relative to the optical structure and at a respective given angle of illumination of the optical structure; or (b) each respective one of some or all of said plurality of portions of the optically variable image can, when reconstructed, only be viewed in full by viewing said respective image portion at a respective given viewing angle and (iv) at or over the respective range of angles of illumination of the optical structure.

4. The optical security device according to claim 2, wherein either:

(i) the respective viewing angle/angle range or angle/angle range of illumination or both thereof at or over which a or any given one of the image portions can be viewed, when reconstructed, is/are substantially the same viewing angle/angle range or angle/angle range of illumination or both thereof at or over which at least one other of said image portions, but not all of those other said image portions, or at least some of but not all of the remaining reconstructed image portions, is/are viewable when reconstructed; or (ii) the respective viewing angle/angle range or angle/angle range of illumination or both thereof at or over which a or any given one of the image portions can be viewed, when reconstructed, is/are substantially different from the respective viewing angle(s)/angle range(s) or angle(s)/angle range(s) of illumination or both thereof at or over which at least one other of the reconstructed image portions, or at least some of the remaining reconstructed image portions, is/are viewable;

whereby, in each case (i) or (ii), in order for the complete reconstructed image to be viewable in its totality, such that all the portions of the complete reconstructed image are each respectively reconstructable and viewable, it is necessary for at least two different viewing angles/angle ranges or angles/angle ranges of illumination or both thereof to be employed to view all the reconstructed image portions.

5. The optical security device according to claim 2, wherein the respective viewing angle/angle range or angle/angle range of illumination or both thereof at or over which a or any given one of the image portions can be viewed, when reconstructed, is/are substantially different from the respective viewing angles/angle ranges or angles/angle ranges of illumination or both thereof at or over which substantially all the other reconstructed image portions are viewable;

whereby in order for the complete reconstructed image to be viewable in its totality, such that all the portions of the complete reconstructed image are each respectively reconstructable and viewable, it is necessary for a plurality of different viewing angles/angle ranges or angles/angle ranges of illumination or both thereof to be employed to view respective ones of the plurality of reconstructed image portions;

wherein each respective viewing angle/angle range or angle/angle range of illumination or both thereof at or over which a respective reconstructed image portion is viewable is unique to that respective reconstructed image portion.

6. The optical security device according to claim 1, wherein the optical structure has recorded or encoded therein a representation of the optically variable image in the form of a plurality of discrete portions of the complete image to be reconstructed, wherein each respective one of said plurality of discrete portions of the optically variable image can, when reconstructed, only be viewed by viewing the respective said discrete image portion (v) at or over a respective viewing angle or angle range relative to the optical structure, or (vi) at or over a respective angle or angle range of illumination of the optical structure, or both (v) and (vi), which is/are different from the viewing angle/angle range or angle/angle range of illumination or both thereof at or over which at least one other of said discrete image portions is viewable when reconstructed.

7. The optical security device according to claim 1, wherein either:

(i) the size, in at least one dimension, direction, axis or plane, of one or more given ones of the viewable portions of the reconstructed image is greater than the corresponding size, in the same, or the respective same, dimension, direction, axis or plane, of a part of the optical structure having said one or more given optically variable image portion(s) recorded or encoded therein; or (ii) the size, in at least one dimension, direction, axis or plane, of a given part of the optical structure having one or more given ones of the optically variable image portion(s) recorded or encoded therein is smaller than the corresponding size, in the same, or the respective same, dimension, direction, axis or plane, of said one or more respective viewable portion(s) of the reconstructed image;

wherein the size differential of the respective reconstructed image portion relative to the respective recorded or encoded image portion of the structure is such that the respective reconstructed image portion is any of: >1 times, or ≥2 times, or ≥3 times, or ≥4 times, or ≥5 times, or ≥6 times, or ≥7 times, or ≥8 times, or ≥9 times, or ≥10 times, or ≥12 times or ≥13 times or ≥15 times or ≥18 times or ≥20 times, the size of the respective recorded image portion of the structure, wherein any of said ranges include fractions as well as whole number multiples.

8. The optical security device according to claim 1, wherein an angular size of the reconstructed image is >1 times, or ≥2 or ≥3 times, or ≥10 times, or ≥20 times the angular size of the optical structure when viewed from a given viewing distance or location therefrom, wherein any of said ranges include fractional multiples as well as whole number multiples.

9. The optical security device according to claim 1, wherein the recorded or encoded representation of the optically variable image is a hologram.

10. The optical security device according to claim 1, wherein either:

(i) the recorded or encoded representation of the optically variable image is a two-dimensional (2-D) or a three-dimensional (3-D) hologram, and the optically variable image is an image of one or more 2-D or 3-D objects, pictures, patterns, one or more alphanumeric or other typographical characters, or any combination of any two or more of any of the foregoing things; or (ii) the optical structure having the portion(s) of the optically variable image recorded or encoded therein is or comprises a DOVID (diffractive optically variable image device).

11. The optical security device according to claim 1, wherein the optical structure defines a structure plane or a plane which is contained within a thickness of the optical structure or a plane which is non-parallel to light incident on the optical structure during the reconstruction of the recorded or encoded image, and the reconstructed image lies either (a) wholly or at least partially to one side of, or to each of both sides of, said structure plane, or (b) out of the structure plane on a side thereof opposite to that from which illuminating light is incident thereon.

12. The optical security device according to claim 1, wherein either:

(i) the device takes the form of a security feature which has already been applied to or incorporated into a structure of an item or object whose security, authentication or identification is required; or (ii) the device is provided in the form of a discrete security device or security element for application, affixation or incorporation into the structure of the item or object whose security, authentication or identification is required.

13. The optical security device according to claim 1, wherein the optical structure in which is recorded or encoded the representation of the optically variable image is, or is contained within or on, a body of optically active material, wherein the body of optically active material comprises a sheet or plate or film or layer of the optically active material with a thickness range of from 0.1 or 0.5 or 1 or 5 or 10 up to 100 or 200 or 300 or 400 or 500 or 800 or 1000 μm.

14. The optical security device according to claim 13, wherein a portion of the body of optically active material in which is recorded or encoded the representation of the optically variable image further comprises one or more additional or auxiliary overt or covert security features formed by modulations of the surface, volume or internal optical properties of said body portion and comprising one or more graphics, holograms, micro- or nano-graphics, diffractive or non-diffractive images and structures, or hidden images.

15. A method for the production of an optical security device according to claim 1, the method comprising:

recording or encoding in an optical structure a recorded or encoded representation of the optically variable image in the form of a plurality of portions of the complete image to be reconstructed, wherein the respective said plurality of portions of the optically variable image can, when reconstructed, only be viewed in their totality by viewing said image (i) at or over a plurality of different viewing angles or angle ranges relative to the optical structure, or (ii) at or over a plurality of different angles or ranges of angles of illumination of the optical structure, or both (i) and (ii), and wherein the size, in at least one dimension, direction, axis or plane, of the complete image, when reconstructed, is greater than the corresponding size, in the same, or the respective same, dimension, direction, axis or plane, of a part of the optical structure having said plurality of portions of the image collectively recorded or encoded therein;

wherein either:

(i) wherein the method comprises forming the optical structure, having said plurality of portions of the record or encoded representation of the complete optically variable image recorded or encoded therein, as an optical security feature, and either simultaneously or subsequently to that recording or encoding incorporating said optical security feature into an item or object whose security, authentication or identification is required; or (ii) wherein the method comprises forming the optical structure, having said plurality of portions of the record or encoded representation of the complete optically variable image recorded or encoded therein, as a discrete optical security device or security element, and the method further comprises a step of applying, affixing or incorporating the optical security device or element onto or into the optical structure of the item or object whose security, authentication or identification is required.

16. A method of authenticating or identifying an item or object having applied or affixed thereto or incorporated into the structure thereof an optical security device according to claim 1, the method comprising:

(a) reconstructing said plurality of portions of the complete optically variable image recorded or encoded in the optical structure of the device; and (b) viewing one or more of said plurality of reconstructed portions of the complete image.

17. The method according to claim 16, wherein the optical security device is an optical security device in which:

the optical structure has recorded or encoded therein a representation of the optically variable image in the form of a plurality of discrete portions of the complete image to be reconstructed, and:

(i) each respective one of said plurality of discrete portions of the optically variable image can, when reconstructed, only be viewed by viewing the respective said discrete image portion (v) at or over a respective viewing angle or angle range relative to the optical structure, or (vi) at or over a respective angle or angle range of illumination of the optical structure, or both (v) and (vi), which is/are different from the viewing angle/angle range or angle/angle range of illumination or both thereof at or over which at least one other of said discrete image portions is viewable when reconstructed; or (ii) a respective viewing angle/angle range or angle/angle range of illumination, or both thereof, at or over which a or any given one of the discrete image portions can be viewed, when reconstructed, is/are substantially the same viewing angle/angle range or angle/angle range of illumination or both thereof at or over which at least one other of said discrete image portions, but not all of those other said discrete image portions, or at least some of but not all of the remaining reconstructed discrete image portions, is/are viewable when reconstructed; or (iii) a respective viewing angle/angle range or angle/angle range of illumination, or both thereof, at or over which a or any given one of the discrete image portions can be viewed, when reconstructed, is/are substantially different from the respective viewing angle(s)/angle range(s) or angle(s)/angle range(s) of illumination or both thereof at or over which at least one other of the of the reconstructed discrete image portions, or at least some of the remaining reconstructed discrete image portions, is/are viewable;

wherein the viewing step (b) comprises:

(bi) viewing the or each respective one of the plurality of reconstructed discrete portions of the complete optically variable image at or over, or only at or over, the respective viewing angle or angle range relative to the optical structure, or by illuminating the optical structure at or over the respective angle or angle range of illumination, or both thereof that is associated with that respective reconstructed discrete image portion of the complete image; or (bii) viewing respective ones of the plurality of reconstructed discrete portions of the complete optically variable image at or over, or only at or over, respective ones of the plurality of different viewing angles/angle ranges or angles/angle ranges of illumination of the optical structure or both thereof; or (biii) both (bi) and (bii);

whereby the complete reconstructed optically variable image is viewable in its totality, such that all the discrete portions of the complete reconstructed image are each respectively reconstructable and viewable, by, or only by:

(ci) viewing the or each respective discrete portion thereof at or over, or only at or over, the respective viewing angle/angle range or angle/angle range of illumination of the optical structure or both thereof that is/are associated with that respective discrete image portion, or (cii) viewing respective ones of the plurality of reconstructed discrete portions thereof at or over, or only at or over, the respective ones of the plurality of different viewing angles/angle ranges or angles/angle ranges of illumination of the optical structure or both thereof, or (ciii) both (ci) and (cii) where each of (bi), (bii) and (biii) corresponds respectively to each of (ci), (cii) and (ciii).

18. The method according to claim 16, wherein the recorded or encoded optically variable image, or the respective portions thereof, is/are reconstructed by illumination of the optical structure, or a respective part or portion or region thereof, by electromagnetic radiation, the electromagnetic radiation being of a wavelength/frequency appropriate to the means used to record/encode or intended for reconstructing the image, wherein the electromagnetic radiation comprises visible light.

19. The method according to claim 16, wherein one of the following (i), (ii) or (iii) is present or satisfied:

(i) the viewing step (b) is carried out by:

(ia) visual viewing of at least a or a respective portion of the image by one or more eyes of a human observer, or (ib) detecting at least a or a respective portion of the image using an optically sensitive device, in combination with image processing hardware or software; or (ii) the viewing step (b) comprises:

viewing a first one of the plurality of portions of the reconstructed image by means of a first viewing step or operation in which just the first portion only of the reconstructed image is viewed; and one or more additional or further viewing steps or operations in each of which a respective additional or further one of the plurality of portions of the reconstructed image is viewed;

wherein in each of said viewing steps or operations the viewing of each respective portion of the reconstructed image is carried out by (ci) viewing each respective portion of the image at or over a given, or at or over a unique, viewing angle or angle range relative to the optical structure, or (cii) illuminating the optical structure at or over a given, or at or over a unique, angle or angle range of illumination, or both (ci) and (cii), that is/are associated with that respective image portion; or (iii) both of the above (i) and (ii) are present or satisfied.

20. The method according to claim 16, wherein the overall complete reconstructed image is of a size, greater than that of the parts of the optical structure in which are recorded or encoded the various portions of the image, such that it is only viewable in its entirety upon a plurality of individual or discrete viewing steps or operations being carried out, each such viewing step or operation being so as to view a respective portion only, or a respective discrete portion only, of the complete reconstructed image, or a respective discrete portion only of the complete reconstructed image independently of the viewing of any of the other portion(s) of the complete reconstructed image.

21. The method according to claim 16, wherein:

plural portions of the complete reconstructed image are viewable independently of each other, and wherein the viewing of the complete reconstructed image is accomplished by illuminating corresponding respective portions of the recorded or encoded image in a plurality of discrete illumination steps or operations, wherein the viewing of the complete reconstructed image is accomplished by illuminating the recorded or encoded image sequentially in a series of discrete viewing steps or operations, each at or over a respective selected one of a plurality of different angles of incidence or ranges of angles of incidence of the incoming light, such that each respective incident angle or angle range corresponds to and enables the viewing of a respective portion of the reconstructed image at or over a respective different viewing angle or a respective different angle range relative to the optical structure.

* * * * *